US010910673B2

(12) United States Patent
Wakimoto et al.

(10) Patent No.: US 10,910,673 B2
(45) Date of Patent: Feb. 2, 2021

(54) RECTANGULAR SECONDARY BATTERY AND METHOD OF MANUFACTURING THE SAME

(71) Applicant: SANYO Electric Co., Ltd., Daito (JP)

(72) Inventors: Ryoichi Wakimoto, Hyogo (JP); Hiroshi Takabayashi, Hyogo (JP)

(73) Assignee: SANYO Electric Co., Ltd., Daito (JP)

( * ) Notice: Subject to any disclaimer, the term of this patent is extended or adjusted under 35 U.S.C. 154(b) by 195 days.

(21) Appl. No.: 16/020,464

(22) Filed: Jun. 27, 2018

(65) Prior Publication Data

US 2019/0006717 A1    Jan. 3, 2019

(30) Foreign Application Priority Data

Jun. 29, 2017 (JP) ................. 2017-126877

(51) Int. Cl.
*H01M 10/0585* (2010.01)
*H01M 2/26* (2006.01)
(Continued)

(52) U.S. Cl.
CPC ......... *H01M 10/0585* (2013.01); *H01M 2/08* (2013.01); *H01M 2/18* (2013.01);
(Continued)

(58) Field of Classification Search
CPC ............ H01M 10/0585; H01M 2/348; H01M 10/0413; H01M 2/26; H01M 4/70; H01M 2/08; H01M 2/18; H01M 2/30; H01M 4/525; H01M 4/505; H01M 4/583; H01M 2004/028; H01M 2220/20; H01M 2200/103; H01M 2200/20; H01M 2004/027; H01M 10/0525; H01M 10/058
(Continued)

(56) References Cited

U.S. PATENT DOCUMENTS

2009/0004561 A1    1/2009  Nansaka et al.
2009/0239133 A1    9/2009  Kosugi
2018/0375162 A1*  12/2018 Wakimoto .............. H01M 2/26

FOREIGN PATENT DOCUMENTS

JP      2008-226625 A    9/2008
JP      2009-32640 A     2/2009
(Continued)

*Primary Examiner* — Gary D Harris
(74) *Attorney, Agent, or Firm* — Westerman, Hattori, Daniels & Adrian, LLP

(57) ABSTRACT

An electrode body, which includes a positive electrode plate and a negative electrode plate, includes a positive-electrode tab group that is composed of a plurality of positive electrode tabs. The positive-electrode tab group is disposed between a sealing plate and an electrode body, and a positive-electrode current collector includes a base portion and a tab connection portion that is folded from an end of the base portion. The base portion of the positive-electrode current collector is connected to a positive electrode terminal, and the tab connection portion of the positive-electrode current collector is connected to the positive-electrode tab group. A fuse portion is formed in the positive-electrode current collector, and a first-insulator second region of a first insulator, which is connected to an inner insulator, is disposed between the base portion and the tab connection portion.

6 Claims, 12 Drawing Sheets

(51) Int. Cl.
*H01M 4/70* (2006.01)
*H01M 2/08* (2006.01)
*H01M 2/18* (2006.01)
*H01M 2/30* (2006.01)
*H01M 2/34* (2006.01)
*H01M 10/04* (2006.01)
H01M 4/525 (2010.01)
H01M 4/505 (2010.01)
H01M 4/583 (2010.01)
H01M 4/02 (2006.01)

(52) U.S. Cl.
CPC ............... *H01M 2/26* (2013.01); *H01M 2/30* (2013.01); *H01M 2/348* (2013.01); *H01M 4/70* (2013.01); *H01M 10/0413* (2013.01); H01M 4/505 (2013.01); H01M 4/525 (2013.01); H01M 4/583 (2013.01); H01M 2004/027 (2013.01); H01M 2004/028 (2013.01); H01M 2200/103 (2013.01); H01M 2200/20 (2013.01); H01M 2220/20 (2013.01)

(58) Field of Classification Search
USPC ........................................................ 429/209
See application file for complete search history.

(56) References Cited

FOREIGN PATENT DOCUMENTS

| WO | 2017/045774 A1 | 3/2017 |
| WO | 2017/045815 A1 | 3/2017 |

* cited by examiner

RECTANGULAR SECONDARY BATTERY AND METHOD OF MANUFACTURING THE SAME

CROSS REFERENCE TO RELATED APPLICATIONS

The present invention application claims priority to Japanese Patent Application No. 2017-126877 filed in the Japan Patent Office on Jun. 29, 2017, the entire contents of which are incorporated herein by reference.

BACKGROUND OF THE INVENTION

Field of the Invention

The present invention relates to a rectangular secondary battery and a method of manufacturing a rectangular secondary battery.

Description of Related Art

Rectangular secondary batteries, such as alkaline secondary batteries and non-aqueous electrolyte secondary batteries, are used as driving electric power sources of electric vehicles (EV), hybrid electric vehicles (HEV, PHEV), and the like.

The rectangular secondary batteries each have a battery case that is composed of a rectangular casing, which has an opening and a bottomed-rectangular-tubular shape, and a sealing plate that seals the opening. The battery case contains an electrode body together with an electrolyte. The electrode body is composed of a positive electrode plate, a negative electrode plate, and a separator. A positive electrode terminal and a negative electrode terminal are attached to the sealing plate. The positive electrode terminal is electrically connected to the positive electrode plate via a positive-electrode current collector, and the negative electrode terminal is electrically connected to the negative electrode plate via a negative-electrode current collector.

The positive electrode plate includes a positive electrode core, which is made of a metal, and a positive-electrode-active-material mixture layer, which is formed on a surface of the positive electrode core. The positive electrode core has a positive-electrode-core exposed portion, on which the positive-electrode-active-material mixture layer is not formed. A positive-electrode current collector is connected to the positive-electrode-core exposed portion. The negative electrode plate includes a negative electrode core, which is made of a metal, and a negative-electrode-active-material mixture layer, which is formed on a surface of the negative electrode core. The negative electrode core has a negative-electrode-core exposed portion, on which the negative-electrode-active-material mixture layer is not formed. A negative-electrode current collector is connected to the negative-electrode-core exposed portion.

For example, Japanese Published Unexamined Patent Application No. 2009-032640 (Patent Document 1) describes a rectangular secondary battery including a rolled electrode body having a rolled positive-electrode-core exposed portion at one end thereof and a rolled negative-electrode-core exposed portion at the other end thereof.

Japanese Published Unexamined Patent Application No. 2008-226625 (Patent Document 2) describes a rectangular secondary battery including an electrode body having a positive-electrode-core exposed portion and a negative-electrode-core exposed portions at one end thereof.

Regarding secondary batteries used for vehicles, in particular, EVs and PHEVs, it is desirable to develop a secondary battery having higher volumetric energy density and larger battery capacity. In the rectangular secondary battery described in Patent Document 1, the inside of the battery case needs to have left and right spaces, for disposing the rolled positive-electrode-core exposed portion and the rolled negative-electrode-core exposed portion, and an upper space between the sealing plate and the rolled electrode body. For this reason, it is difficult to increase the volumetric energy density of the secondary battery.

In contrast, as in the rectangular secondary battery described in Patent Document 2, by using an electrode body having a positive-electrode-core exposed portion and a negative-electrode-core exposed portion at one end thereof a rectangular secondary battery having high volumetric energy density can be more easily obtained.

A fuse portion, which blows when an excessively large current flows therethrough, may be formed in the current collector.

BRIEF SUMMARY OF THE INVENTION

An object of the present invention is to provide a rectangular secondary battery having higher volumetric energy density and higher reliability.

A rectangular secondary battery according to an aspect of the present invention includes a rectangular casing that has an opening, a sealing plate that seals the opening, an electrode body that is disposed in the rectangular casing and that includes a positive electrode plate and a negative electrode plate, a tab that is connected to the positive electrode plate or the negative electrode plate, a current collector that is connected to the tab, a terminal that is electrically connected to the current collector and that extends through the sealing plate, and an inner insulator that is disposed between the sealing plate and at least one of the terminal and the current collector. A first tab group that is composed of a plurality of the tabs is connected to the electrode body. The first tab group is disposed between the sealing plate and the electrode body. The current collector includes a base portion and a tab connection portion that is folded from an end of the base portion. The tab connection portion of the current collector is connected to the first tab group. A fuse portion is formed in the current collector. An insulator is disposed between the base portion and the tab connection portion. The insulator is connected to the inner insulator.

In the rectangular secondary battery according to the aspect of the present invention, the first tab group is disposed between the sealing plate and the electrode body. Accordingly, the rectangular secondary battery can have higher volumetric energy density. Moreover, because the fuse portion is formed in the current collector, the rectangular secondary battery can have high reliability. Furthermore, because the insulator is disposed between the base portion and the tab connection portion of the current collector, it is possible to prevent reconnection of a conduction path that is cut after the fuse portion blows. Because the insulator is connected to the inner insulator, it is possible to prevent displacement of the insulator.

Preferably, the terminal includes a flange portion at a position nearer than the sealing plate to the electrode body, and the base portion of the current collector is connected to a surface of the flange portion facing the electrode body.

Preferably, the fuse portion is formed at a boundary between the base portion and the tab connection portion. In this case, it is possible to more effectively prevent reconnection of a conduction path that is cut after the fuse portion blows.

Preferably, the rectangular secondary battery further includes a short-circuit mechanism that operates when a pressure inside a battery case, which is composed of the rectangular casing and the sealing plate, becomes a predetermined pressure or higher, and that short-circuits the positive electrode plate and the negative electrode plate at a position outside of the electrode body.

Preferably, the insulator includes a first region extending in a longitudinal direction of the sealing plate, and a second region extending from the first region in a transversal direction of the sealing plate; and at least a part of the second region is disposed between the base portion and the tab connection portion.

Preferably, the insulator includes a body and an arm extending from the body toward the sealing plate, and the arm is connected to the inner insulator.

A method of manufacturing a rectangular secondary battery according to an aspect of the present invention is a method of manufacturing a rectangular secondary battery including a rectangular casing that has an opening, a sealing plate that seals the opening, an electrode body that is disposed in the rectangular casing and that includes a positive electrode plate and a negative electrode plate, a tab that is connected to the positive electrode plate or the negative electrode plate, a first tab group that is composed of a plurality of the tabs, a terminal that is electrically connected to the current collector and that extends through the sealing plate, and an inner insulator that is disposed between the sealing plate and at least one of the terminal and the current collector. The first tab group is disposed between the sealing plate and the electrode body, the current collector includes a base portion and a tab connection portion that is folded from an end of the base portion, a fuse portion is formed in the current collector, and an insulator is disposed between the base portion and the tab connection portion.

The method includes an attachment step of attaching the inner insulator, the terminal, and the current collector to the sealing plate, a tab-group connecting step of connecting the first tab group to the current collector, and an insulator connecting step of connecting the insulator to the inner insulator after the attachment step and the tab-group connecting step.

Preferably, the method further includes a bending step of bending the current collector after the insulator connecting step.

The present invention can provide a rectangular secondary battery having higher volumetric energy density and higher reliability.

DETAILED DESCRIPTION OF THE INVENTION

Hereinafter, the structure of a rectangular secondary battery 20 according to an embodiment will be described. Note that the present invention is not limited to the embodiment described below.

Figure 1:
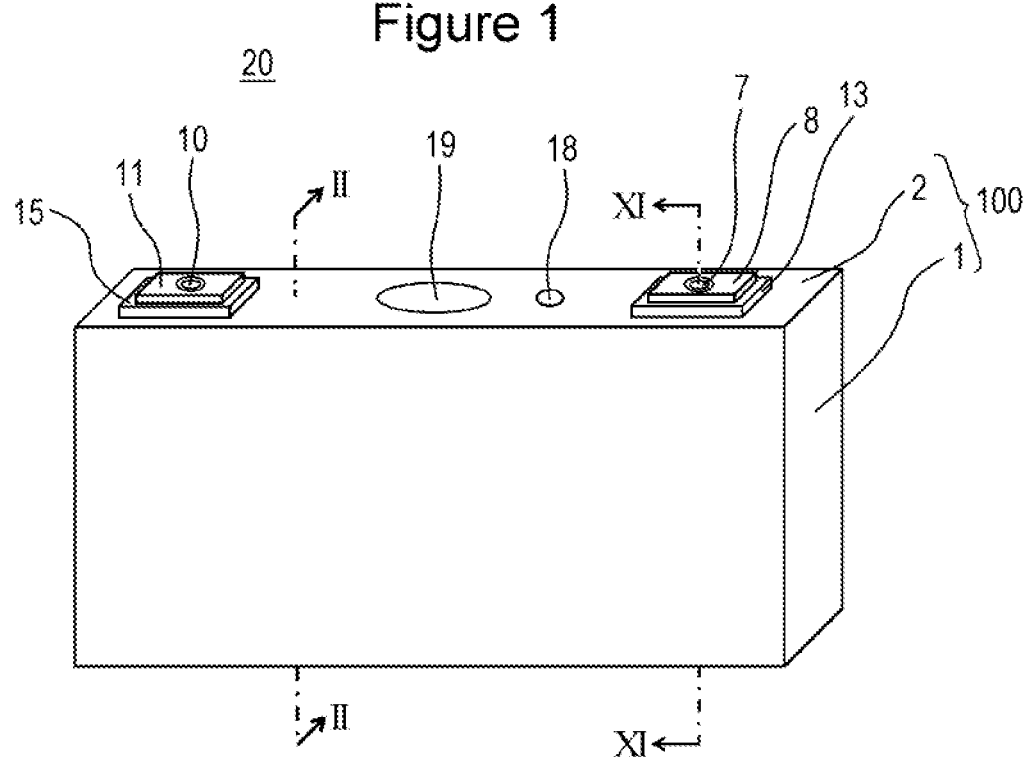
FIG. 1 is a perspective view of a rectangular secondary battery according to an embodiment.
Figure 2:
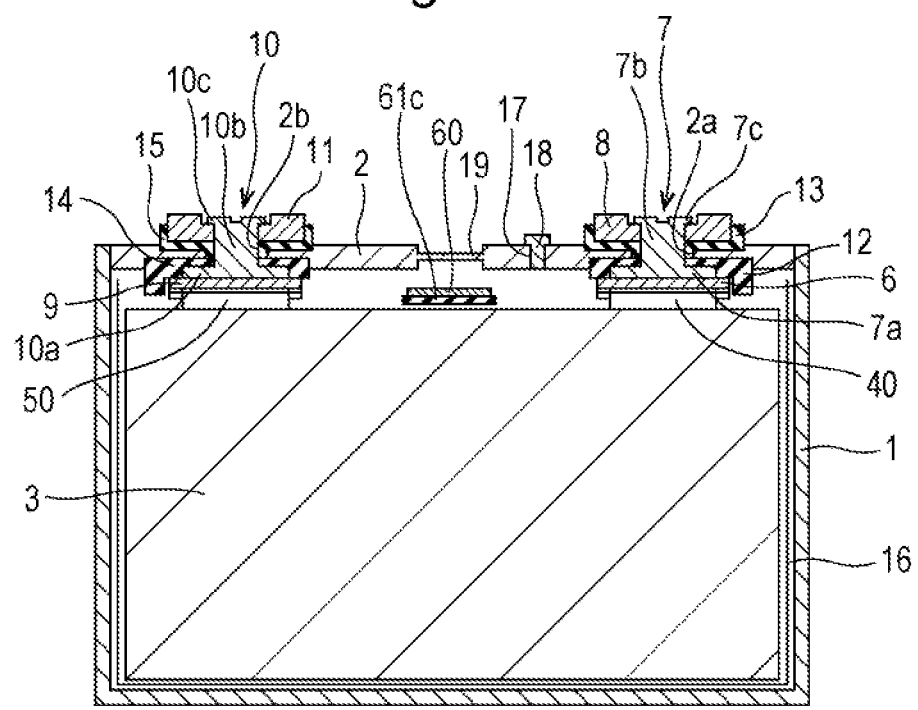
FIG. 2 is a sectional view taken along line II-II of FIG. 1.

As illustrated in FIGS. 1 and 2, the rectangular secondary battery 20 includes a battery case 100 that is composed of a rectangular casing 1, which has an opening and a bottomed-rectangular-tubular shape, and a sealing plate 2 that seals the opening of the rectangular casing 1. Preferably, the rectangular casing 1 and the sealing plate 2 are each made of a metal, such as aluminum or an aluminum alloy. The rectangular casing 1 contains an electrode body 3 together with an electrolyte. The electrode body 3 includes a positive electrode plate, a negative electrode plate, and a separator. An insulating sheet 16 is disposed between the electrode body 3 and the rectangular casing 1.

A positive-electrode tab group 40, which is composed of a plurality of positive electrode tabs, and a negative-electrode tab group 50, which is composed of a plurality of negative electrode tabs, are disposed at an end of the electrode body 3 adjacent to the sealing plate 2. The positive-electrode tab group 40 is electrically connected to a positive electrode terminal 7 via a positive-electrode current collector 6. The positive electrode terminal 7 extends through the sealing plate 2 and is connected to a positive-electrode outer conductor 8, which is disposed further outward from the sealing plate 2 with respect to the battery. The negative-electrode tab group 50 is electrically connected to a negative electrode terminal 10 via a negative-electrode current collector 9. The negative electrode terminal 10 extends through the sealing plate 2 and is connected to a negative-electrode outer conductor 11, which is disposed further outward from the sealing plate 2 with respect to the battery.

The positive electrode terminal 7 includes a flange portion 7a and an insertion portion 7b. The insertion portion 7b of the positive electrode terminal 7 is inserted, from the inside of the battery, a positive-electrode-terminal attachment hole 2a in the sealing plate 2, and a through-hole in the positive-electrode outer conductor 8. An end portion of the insertion portion 7b is upset on the positive-electrode outer conductor 8. Thus, an upset portion 7c is formed. The negative electrode terminal 10 includes a flange portion 10a and an insertion portion 10b. The insertion portion 10b of the negative electrode terminal 10 is inserted, from the inside of the battery, a negative-electrode-terminal attachment hole 2b in the sealing plate 2, and a through-hole in the negative-electrode outer conductor 11. An end portion of the insertion portion 10b is upset on the negative-electrode outer conductor 11. Thus, an upset portion 10c is formed.

An inner insulator 12, which is made of a resin, is disposed between the sealing plate 2 and the positive electrode terminal 7. An outer insulator 13, which is made of a resin, is disposed between the sealing plate 2 and the positive-electrode outer conductor 8. An inner insulator 14, which is made of a resin, is disposed between the sealing plate 2 and the negative electrode terminal 10. An outer insulator 15, which is made of a resin, is disposed between the sealing plate 2 and the negative-electrode outer conductor 11.

The positive-electrode current collector 6, the positive electrode terminal 7, and the positive-electrode outer conductor 8 are each made of preferably, a metal, and more preferably, aluminum or an aluminum alloy.

Preferably, the negative-electrode current collector 9, the negative electrode terminal 10, and the negative-electrode outer conductor 11 are each made of a metal. Preferably, the negative-electrode current collector 9 is made of copper or a copper alloy. A nickel layer may be formed on a surface of the negative-electrode current collector 9. Preferably, the negative electrode terminal 10 is made of copper, a copper alloy, aluminum, or an aluminum alloy. A nickel layer may be formed on a surface of the negative electrode terminal 10. Preferably, the negative-electrode outer conductor 11 is made of copper, a copper alloy, aluminum, or an aluminum alloy. A nickel layer may be formed on a surface of the negative-electrode outer conductor 11.

Particularly preferably, the negative electrode terminal 10 is made of at least two types of metals, a part of the negative electrode terminal 10 inside the battery is made of copper or a copper alloy, and a part of the negative electrode terminal 10 outside the battery is made of aluminum or an aluminum alloy. Preferably, the negative-electrode outer conductor 11 made of aluminum or an aluminum alloy is connected to a part of the negative electrode terminal 10 made of aluminum or an aluminum alloy. Preferably, the negative-electrode current collector 9 made of copper or a copper alloy is connected to a part of the negative electrode terminal 10 made of copper or a copper alloy.

The sealing plate 2 has a liquid injection hole 17. After injecting an electrolyte solution into the battery case 100 from the liquid injection hole 17, the liquid injection hole 17 is sealed with a sealing plug 18. The sealing plate 2 has a gas discharge valve 19 that breaks and discharges a gas from the inside to the outside of the battery case 100 if the pressure inside the battery case 100 becomes a predetermined pressure or higher. A shielding member 60, which is made of a metal, is disposed between the gas discharge valve 19 and the electrode body 3. The shielding member 60 is welded to a surface of the sealing plate 2 facing the electrode body 3.

Next, a method manufacturing the rectangular secondary battery 20 will be described.

Production of Positive Electrode Plate

Positive electrode slurry including the following substances is prepared: a lithium-nickel-cobalt-manganese composite oxide, as a positive electrode active material; a polyvinylidene fluoride (PVdF), as a binder, a carbon material, as a conducting material; and an N-methyl-2-pyrrolidone (NMP), as a dispersion medium. The positive electrode slurry is applied to both surfaces of a strip-shaped aluminum foil having a thickness of 15 μm, which is a positive electrode core. By removing NMP from the positive electrode slurry by drying the slurry, positive-electrode-active-material mixture layers are formed on the positive electrode core. Subsequently, the positive-electrode-active-material mixture layers are compressed to have a predetermined thickness. A positive electrode plate, obtained as described above, is cut into a predetermined shape.

Figure 3:
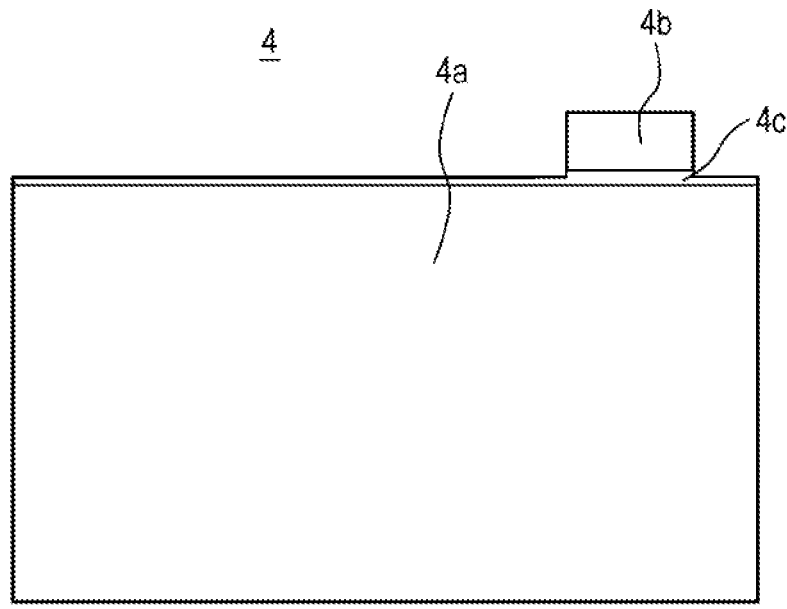
FIG. 3 is a plan view of a positive electrode plate according to the embodiment.

FIG. 3 is a plan view of a positive electrode plate 4 made by using the method described above. As illustrated in FIG. 3, the positive electrode plate 4 has a body in which positive-electrode-active-material mixture layers 4a are formed on both surfaces of the rectangular positive electrode core. The positive electrode plate 4 has a positive electrode tab 4b. A part of the positive electrode core protrudes from an edge of the body, and the protruding part of the positive electrode core is the positive electrode tab 4b. Preferably, a positive electrode protection layer 4c is formed on a part of the positive electrode core near the base of the positive electrode tab 4b. The positive electrode protection layer 4c is a layer having a lower electroconductivity than the positive-electrode-active-material mixture layer 4a. Preferably, the positive electrode protection layer 4c includes ceramic particles, which are made of alumina, silica, zirconia, or the like, and a binder. The positive electrode protection layer 4c may include electroconductive particles made or a carbon material or the like. As illustrated in FIG. 3, the width of the positive electrode protection layer 4c (in the left-right direction in FIG. 3) may be greater than the width of the positive electrode tab 4b. For example, the positive electrode protection layer 4c may be formed on the entire region at one end of the positive electrode plate 4.

Production of Negative Electrode Plate

Negative electrode slurry including the following substances is prepared: graphite, as a negative electrode active material; styrene-butadiene rubber (SBR), as a binder; carboxymethyl cellulose (CMC), as a thickener, and water. The negative electrode slurry is applied to both surfaces of a strip-shaped copper foil having a thickness of 8 µm, which is a negative electrode core. By removing water in the negative electrode slurry by drying the negative electrode slurry, negative-electrode-active-material mixture layers are formed on the negative electrode core. Subsequently, the negative-electrode-active-material mixture layers are compressed to have a predetermined thickness. A negative electrode plate, obtained as described above, is cut into a predetermined shape.

Figure 4:
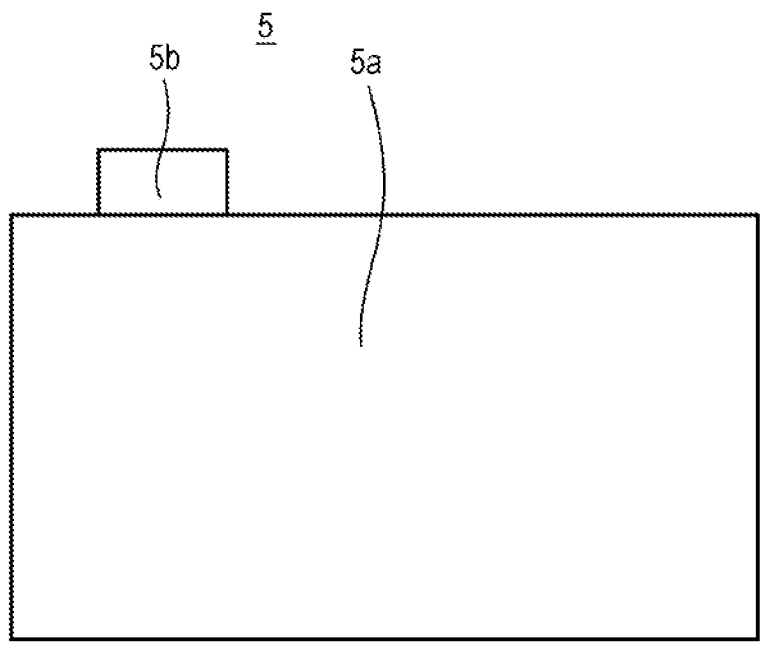
FIG. 4 is a plan view of a negative electrode plate according to the embodiment.

FIG. 4 is a plan view of a negative electrode plate 5 made by using the method described above. As illustrated in FIG. 4, the negative electrode plate 5 has a body in which negative-electrode-active-material mixture layers 5*a* are formed on both surfaces of the rectangular negative electrode core. The negative electrode plate 5 has a negative electrode tab 5*b*. A part of the negative electrode core protrudes from an edge of the body, and the protruding part of the negative electrode core is the negative electrode tab 5*b*.

Production of Electrode Body

Figure 5:
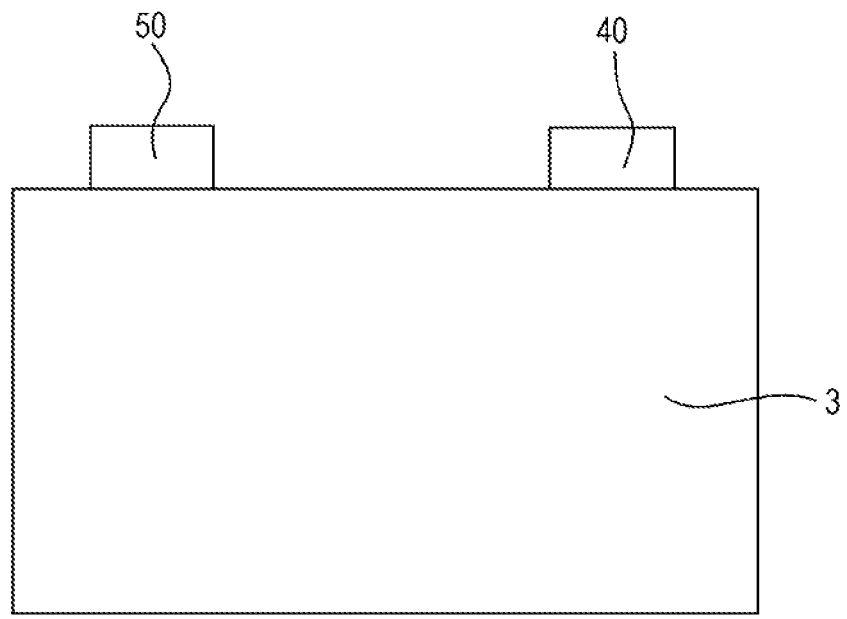
FIG. 5 is a plan view of an electrode body according to the embodiment.

A hundred positive electrode plates 4 and a hundred-and-one negative electrode plates 5 are produced by using the methods described above, and a stacked electrode body 3 is produced by stacking these electrode plates with rectangular polyolefin separators therebetween. As illustrated in FIG. 5, the electrode body 3 has, at one end thereof, the positive-electrode tab group 40, in which a plurality of positive electrode tabs 4*b* are stacked; and the negative-electrode tab group 50, in which a plurality of negative electrode tabs 5*b* are stacked. Separators are disposed on both outer surfaces of the electrode body 3, and the electrode plates and the separators can be fixed to each other in the stacked state by using a tape or the like. Alternatively, the separators may have adhesive layers so that the separators and the positive electrode plates 4 can be bonded to each other and the separators and the negative electrode plates 5 can be bonded to each other.

Preferably, the size of the separator in plan view is the same as that of the negative electrode plate 5 or greater than that of the negative electrode plate 5. The positive electrode plates 4 may each be disposed between a pair of separators, edges of the separators may be fused, and then the positive electrode plates 4 and the negative electrode plates 5 may be stacked. Note that, when producing the electrode body 3, by using a strip-shaped separator, the positive electrode plates 4 and the negative electrode plates 5 may be stacked while folding the strip-shaped separator in a zigzag pattern. By using a strip-shaped separator, the positive electrode plates 4 and the negative electrode plates 5 may be stacked while rolling up the strip-shaped separator.

Assembly of Sealing Body

Figure 6:
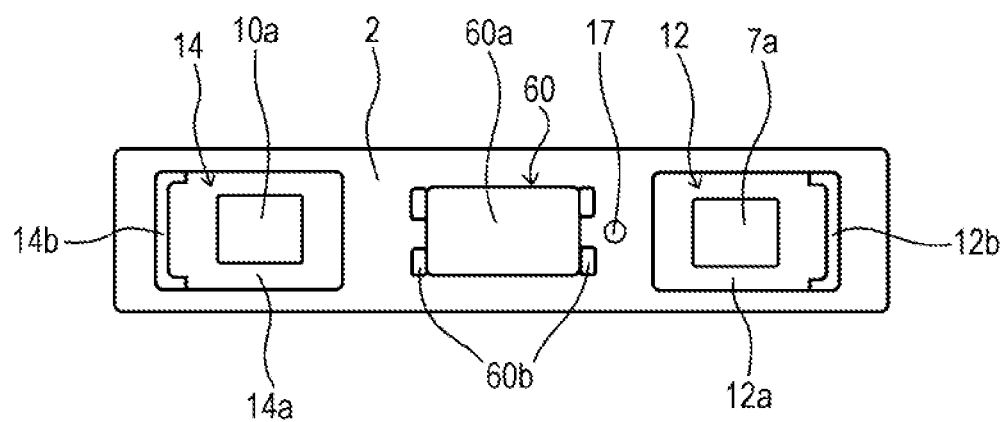
FIG. 6 illustrates a surface of a sealing plate facing the electrode body, after components have been attached.

Referring to FIGS. 2 and 6, a method of attaching the positive electrode terminal 7, the positive-electrode outer conductor 8, the negative electrode terminal 10, and the negative-electrode outer conductor 11 to the sealing plate 2 will be described.

The outer insulator 13 and the positive-electrode outer conductor 8 are placed on a surface, facing the outside of the battery, of a part of the sealing plate 2 around the positive-electrode-terminal attachment hole 2*a*, and the inner insulator 12 is placed on a surface, facing the inside of the battery, of a part of the sealing plate 2 around the positive-electrode-terminal attachment hole 2*a*. Next, the insertion portion 7*b* of the positive electrode terminal 7 is inserted into the through-hole in the inner insulator 12, the positive-electrode-terminal attachment hole 2*a* in the sealing plate 2, the through-hole in the outer insulator 13, and the through-hole in the positive-electrode outer conductor 8. Then, the end portion of the insertion portion 7*b* is upset on the positive-electrode outer conductor 8. Thus, the upset portion 7*c* is formed. Then, the positive electrode terminal 7, the inner insulator 12, the outer insulator 13, and the positive-electrode outer conductor 8 are attached to the sealing plate 2. Preferably, the upset portion 7*c* of the positive electrode terminal 7 and the positive-electrode outer conductor 8 are welded to each other by laser welding or the like.

The outer insulator 15 and the negative-electrode outer conductor 11 are placed on a surface, facing the outside of the battery, of a part of the sealing plate 2 around the negative-electrode-terminal attachment hole 2*b*, and the inner insulator 14 is disposed on a surface, facing the inside of the battery, of a part of the sealing plate 2 around the negative-electrode-terminal attachment hole 2*b*. Next, the insertion portion 10*b* of the negative electrode terminal 10 is inserted into the through-hole in the inner insulator 14, the negative-electrode-terminal attachment hole 2*b* in the sealing plate 2, the through-hole in the outer insulator 15, and the through-hole in the negative-electrode outer conductor 11. Then, the end portion of the insertion portion 10*b* is upset on the negative-electrode outer conductor 11. Thus, the upset portion 10*c* is formed. Then, the negative electrode terminal 10, the inner insulator 14, the outer insulator 15, and the negative-electrode outer conductor 11 are attached to the sealing plate 2. Preferably, the upset portion 10*c* of the negative electrode terminal 10 and the negative-electrode outer conductor 11 are welded to each other by laser welding or the like.

The shielding member 60, which is made of aluminum or an aluminum alloy, is welded to a surface of the sealing plate 2 facing the inside of the battery. The shielding member 60 includes a shielding portion 60*a* disposed separate from the sealing plate 2, and a plurality of connection arms 60*b* extending from end portions of the shielding portion 60*a* toward the sealing plate 2. The plurality of connection arm 60*b* are welded to the sealing plate 2. A gap, which serves a gas flow passage, is formed between the connection arms 60*b*.

The inner insulator 12 includes an insulator base portion 12*a* disposed along the sealing plate 2, and an insulator side wall 12*b* formed at an end of the insulator base portion 12*a* in the longitudinal direction of the sealing plate 2. The inner insulator 14 includes an insulator base portion 14*a* disposed along the sealing plate 2, and an insulator side wall 14*b* formed at an end of the insulator base portion 14*a* in the longitudinal direction of the sealing plate 2.

Connection of Current Collectors and Tabs

Figure 7:
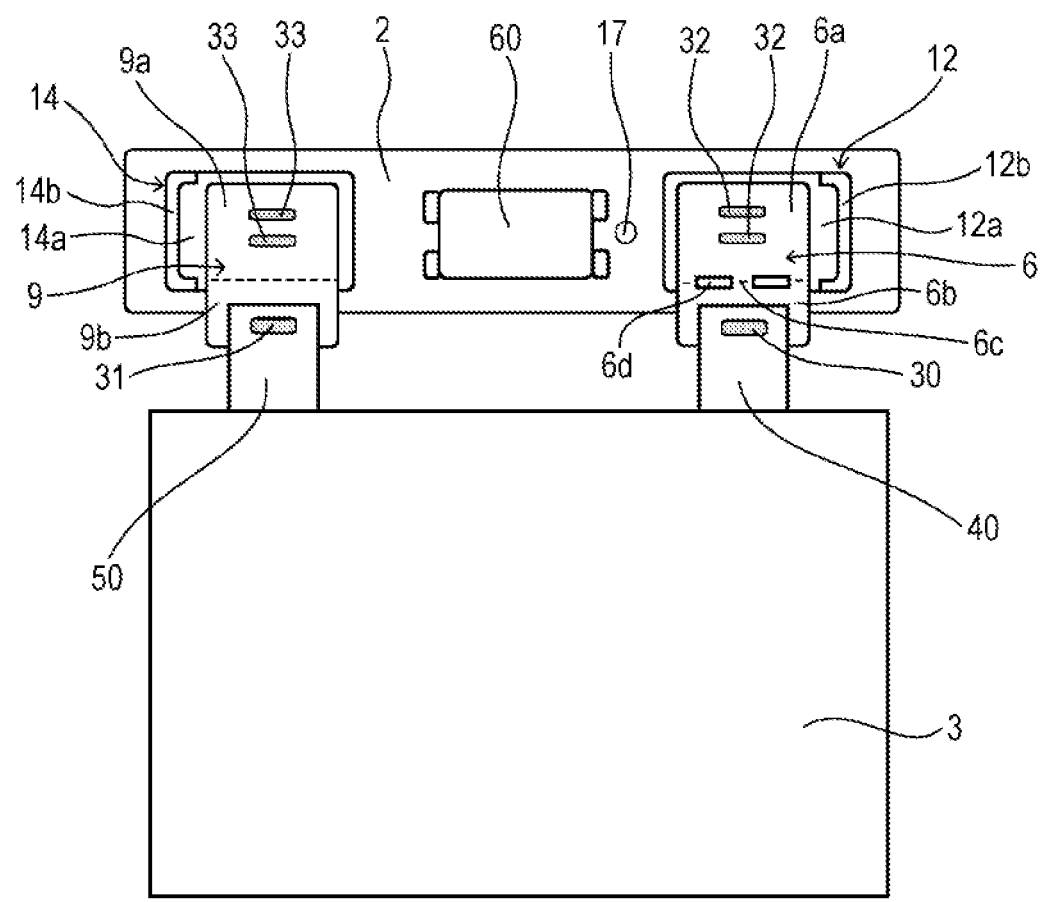
FIG. 7 illustrates the surface of the sealing plate facing the electrode body and the electrode body, after tab groups have been connected to the current collectors.

As illustrated in FIG. 7, the positive-electrode current collector 6 and the positive-electrode tab group 40 are welded to each other, and thereby a joint 30 is formed. The negative-electrode current collector 9 and the negative-electrode tab group 50 are welded to each other, and thereby a joint 31 is formed. The welding method may be, for example, ultrasonic welding, resistance welding, or energy beam welding such as laser beam welding.

Connection of Terminals and Current Collectors

The positive-electrode current collector 6 and the flange portion 7*a* of the positive electrode terminal 7 are welded to each other, and thereby joints 32 are formed. The negative-electrode current collector 9 and the flange portion 10*a* of the negative electrode terminal 10 are welded to each other, and thereby joints 33 are formed.

Connection of terminals and current collectors may be performed before or after connection of the current collectors and the tab groups. The positive electrode terminal 7 and the positive-electrode current collector 6, and the negative electrode terminal 10 and the negative-electrode current collector 9 may be respectively connected to each other beforehand; and subsequently, the positive-electrode current collector 6 and the positive-electrode tab group 40, and the negative-electrode current collector 9 and the negative-electrode tab group 50 may be respectively connected to each other. In this case, the current collectors can be bent beforehand before the tab groups are connected to the current collectors.

The positive-electrode current collector 6 includes a base portion 6a and a tab connection portion 6b. The positive electrode terminal 7 is connected to the base portion 6a, and the positive-electrode tab group 40 is connected to the tab connection portion 6b. A fuse portion 6c is disposed at the boundary between the base portion 6a and the tab connection portion 6b. The fuse portion 6c is a portion whose cross-sectional area is reduced by forming fuse holes 6d. In addition to the fuse holes 6d or instead of the fuse holes 6d, cutouts, grooves, or the like may be formed. The negative-electrode current collector includes a base portion 9a and a tab connection portion 9b. The negative electrode terminal 10 is connected to the base portion 9a, and the negative-electrode tab group 50 is connected to the tab connection portion 9b.

Connection of Insulators

Figure 8:
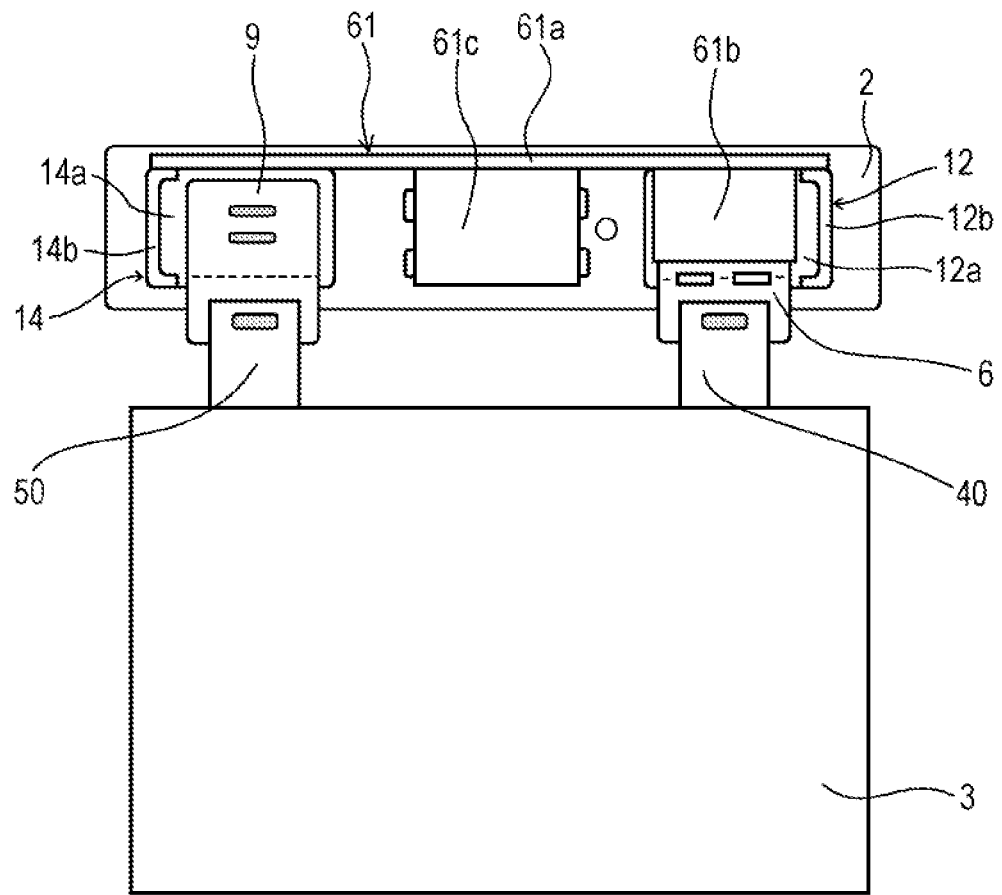
FIG. 8 illustrates the surface of the sealing plate facing the electrode body and the electrode body, after a first insulator has been connected to inner insulators.

As illustrated in FIG. 8, a first insulator 61, which is made of a resin, can be connected to the inner insulator 12 and the inner insulator 14. The first insulator 61 includes a first-insulator first region 61a extending in the longitudinal direction of the sealing plate 2, a first-insulator second region 61b disposed on the first-insulator first region 61a, and a first-insulator third region 61c disposed on the first-insulator first region 61a. The first insulator 61 may be connected only to the inner insulator 12.

The first-insulator first region 61a of the first insulator 61 is connected to the insulator side wall 12b and the insulator side wall 14b. The connection method may be, for example, adhesion, fitting, or the like. For example, one of a recess and a protrusion may be formed in the first-insulator first region 61a, the other of a recess and a protrusion is formed in each of the insulator side wall 12b and the insulator side wall 14b, and the recess and the protrusion may be fitted to each other.

The first-insulator second region 61b of the first insulator 61 is placed so as to face the base portion 6a of the positive-electrode current collector 6. The first-insulator third region 61c of the first insulator 61 is placed so as to face the shielding member 60. Preferably, in a direction perpendicular to the sealing plate 2, the distance between the sealing plate 2 and the first-insulator third region 61c is greater than the distance between the sealing plate 2 and the first-insulator second region 61b.

Figure 9:
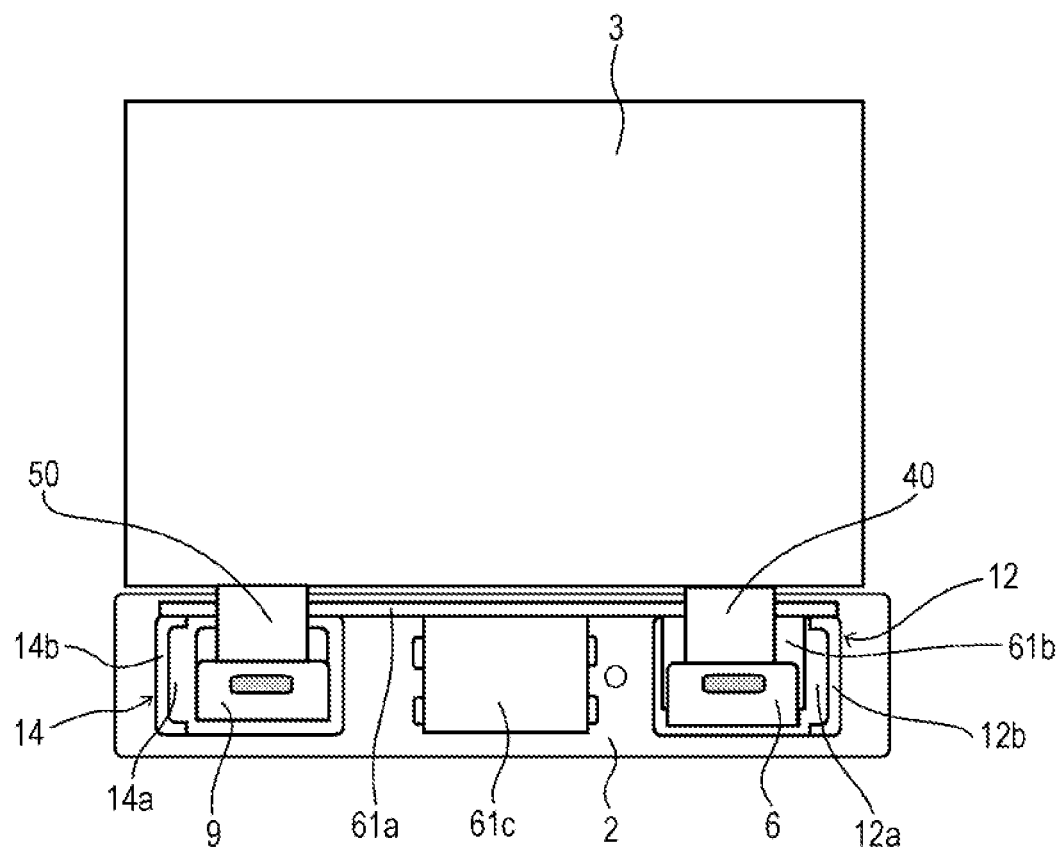
FIG. 9 illustrates the surface of the sealing plate facing the electrode body and the electrode body, after the current collectors have been folded.
Figure 10:
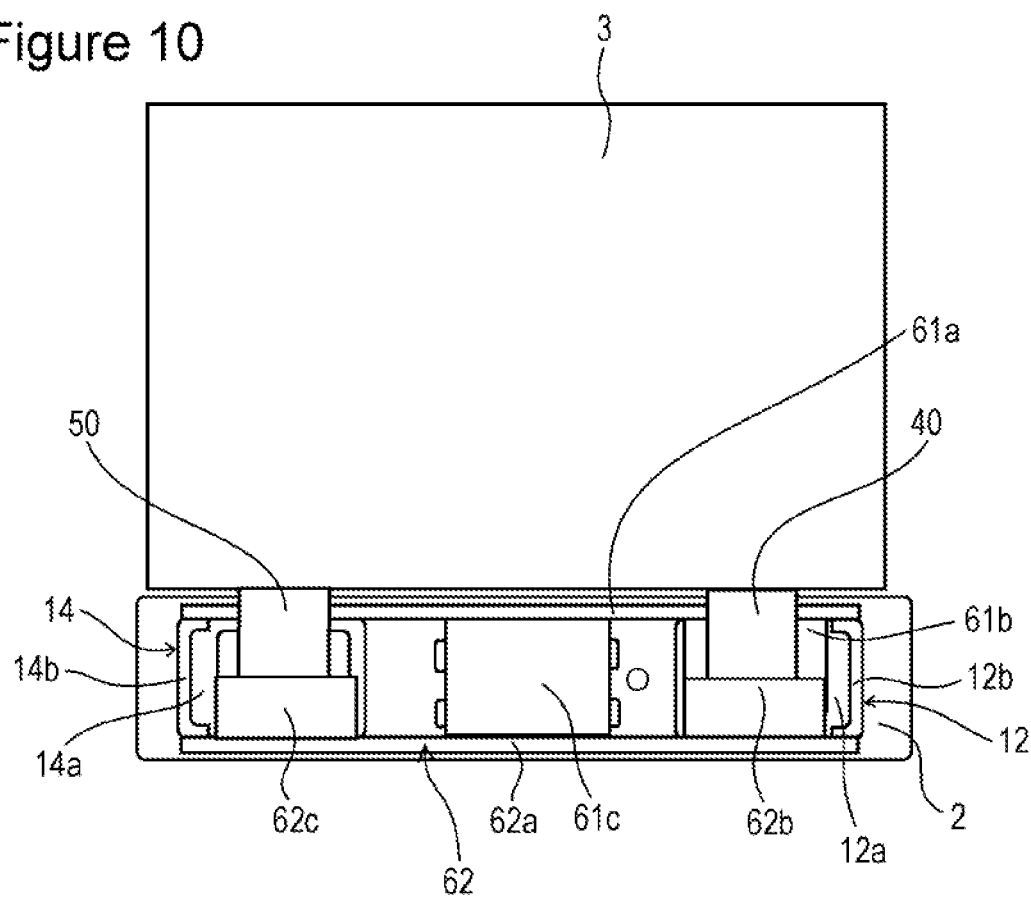
FIG. 10 illustrates the surface of the sealing plate facing the electrode body and the electrode body, after a second insulator has been connected to the inner insulator.

As illustrated in FIG. 9, the positive-electrode current collector 6 is folded at the boundary between the base portion 6a and the tab connection portion 6b, and the negative-electrode current collector 9 is folded at the boundary between the base portion 9a and the tab connection portion 9b. Thus, the first-insulator second region 61b, which is an insulator, is disposed between the base portion 6a and the tab connection portion 6b of the positive-electrode current collector 6.

After folding the positive-electrode current collector 6 and the negative-electrode current collector 9, the first insulator 61 may be connected to the inner insulator 12 and the inner insulator 14, and the first-insulator second region 61b, which is an insulator, may be placed between the base portion 6a and the tab connection portion 6b of the positive-electrode current collector 6.

Next, a second insulator 62, which is made of a resin, can be connected to the inner insulator 12 and the inner insulator 14. The second insulator 62 includes a second-insulator first region 62a extending in the longitudinal direction of the sealing plate 2, a second-insulator second region 62b disposed on the second-insulator first region 62a, and a second-insulator third region 62c disposed on the second-insulator first region 62a.

The second-insulator first region 62a is connected to the insulator side wall 12b and the insulator side wall 14b. The second-insulator second region 62b of the second insulator 62 is placed so as to face the tab connection portion 6b of the positive-electrode current collector 6. The second-insulator third region 62c of the second insulator 62 is placed so as to face the tab connection portion 9b of the negative-electrode current collector 9.

Figure 11:
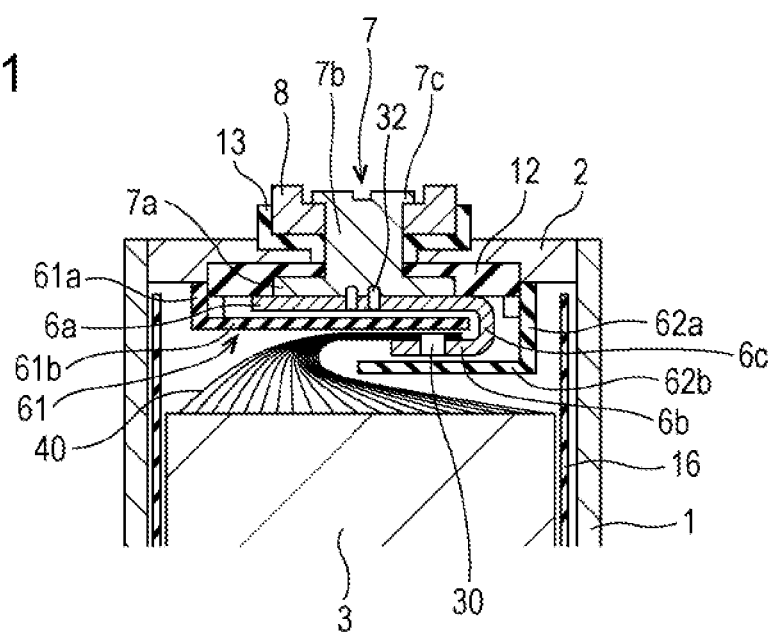
FIG. 11 is a sectional view of a region near a positive electrode terminal, taken along line XI-XI of FIG. 1.

FIG. 11 is a sectional view of a region near the positive electrode terminal, taken along line XI-XI of FIG. 1. As illustrated in FIG. 11, the first-insulator second region 61b, which is an insulator, is disposed between the base portion 6a and the tab connection portion 6b of the positive-electrode current collector 6. Accordingly, it is possible to prevent electrical connection between the base portion 6a and the tab connection portion 6b, which may occur if the base portion 6a contacts the tab connection portion 6b or the positive-electrode tab group 40 after the fuse portion 6c blows. Because the first insulator 61 is connected to the inner insulator 12, which is fixed to the sealing plate 2, displacement of the first insulator 61 due to an impact, vibration, or the like is effectively prevented.

In the transversal direction of the sealing plate 2, one end of the first-insulator first region 61a (the left end in FIG. 11) is located nearer than an end of the flange portion 7a of the positive electrode terminal 7 to the rectangular casing 1, and other end of the first-insulator first region 61a (the right end in FIG. 11) is located nearer than the joint 32 to the fuse portion 6c. Preferably, in the transversal direction of the sealing plate 2, one end portion of the first-insulator first region 61a (the left end in FIG. 11) is located nearer than the flange portion 7a of the positive electrode terminal 7 to the rectangular casing 1, and the other end portion of the first-insulator first region 61a (the right end in FIG. 11) is located nearer than the flange portion 7a of the positive electrode terminal 7 to the fuse portion 6c. Preferably, when seen in the direction perpendicular to the sealing plate 2, the first-insulator second region 61b is disposed at a position overlapping the tab connection portion 6b.

Preferably, the positive-electrode tab group 40 is disposed between the base portion 6a and the tab connection portion 6b and is welded to a surface of the tab connection portion 6b facing the base portion 6a. In this case, even if the electrode body 3 moves due to vibration or an impact, it is possible to prevent damage to the joint 30 between the positive-electrode tab group 40 and the positive-electrode current collector 6. In this case, more preferably, as illustrated in FIG. 11, in the transversal direction of the sealing plate 2, an end portion of the first-insulator second region 61b adjacent to the fuse portion 6c is located nearer to the fuse portion 6c than an end portion of the positive-electrode tab group 40 adjacent to the fuse portion 6c. Thus, it is possible to reliably prevent the base portion 6a and the positive-electrode tab group 40 from being electrically connected to each other after the fuse portion 6c blows.

When the second insulator 62 is disposed as illustrated in FIG. 11, it is possible to effectively suppress splashing of molten metal when the fuse portion 6c blows. However, the second insulator 62 may be omitted.

The first-insulator third region 61c of the first insulator 61, which is made of a resin, is disposed between the shielding member 60 and the electrode body 3, each of which is made of a metal. Therefore, even if the electrode body 3 moves toward the sealing plate 2 due to an impact, vibration, or the like, it is possible to effectively prevent the electrode body 3 from directly contacting the sealing plate 2, the positive-electrode current collector 6, or the negative-electrode current collector 9. The second-insulator first region 62a may have a second-insulator fourth region that covers the shielding member 60.

First Modification

Figure 12:
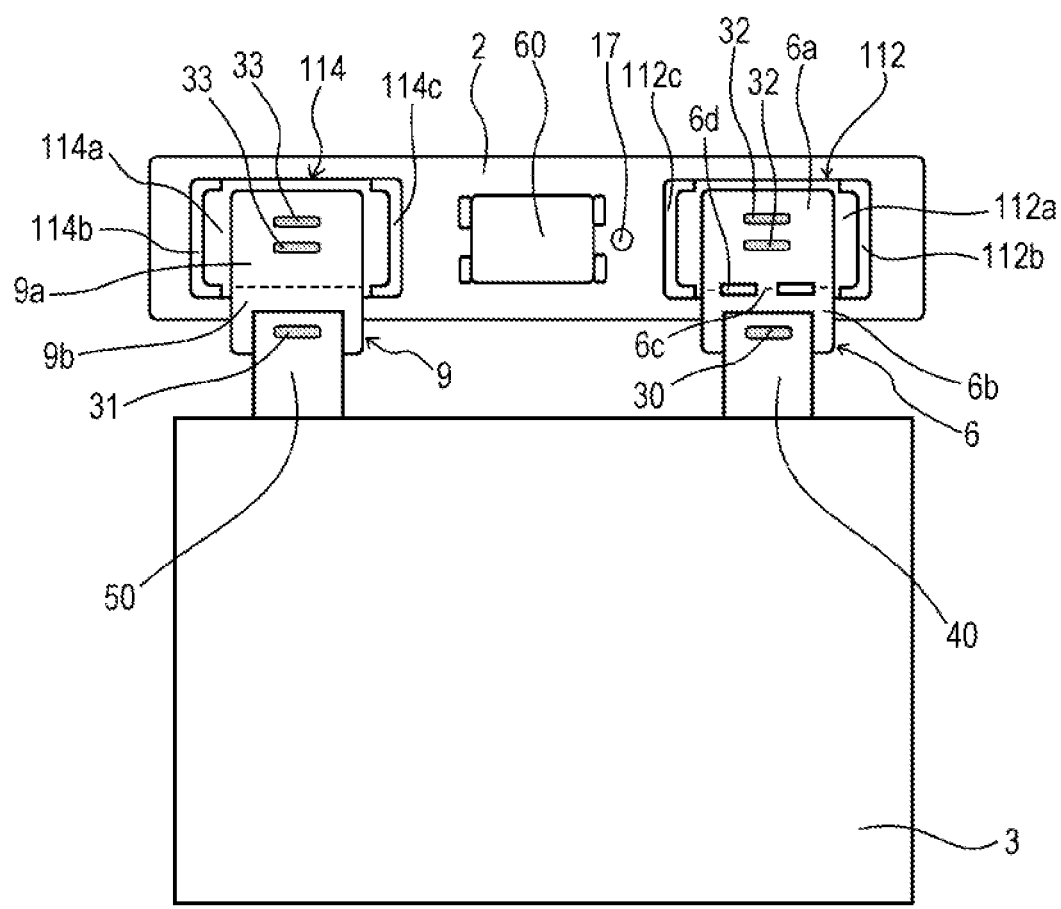
FIG. 12 illustrates a surface of a sealing plate facing an electrode body and the electrode body of a rectangular secondary battery according to a first modification, after the electrode body has been attached.

A rectangular secondary battery according to a first modification differs from the rectangular secondary battery 20 according to the embodiment in the shape of the inner insulator. FIG. 12 illustrates a surface of a sealing plate facing an electrode body and the electrode body of the rectangular secondary battery according to the first modification, after the electrode body has been attached. An inner insulator 112 includes an insulator base portion 112a disposed along the sealing plate 2; and an insulator first side wall 112b and an insulator second side wall 112c, which are formed at ends of the insulator base portion 112a in the longitudinal direction of the sealing plate 2. An inner insulator 114 includes an insulator base portion 114a disposed along the sealing plate 2; and an insulator first side wall 114b and an insulator second side wall 114c, which are formed at ends of the insulator base portion 114a in the longitudinal direction of the sealing plate 2.

Figure 13:
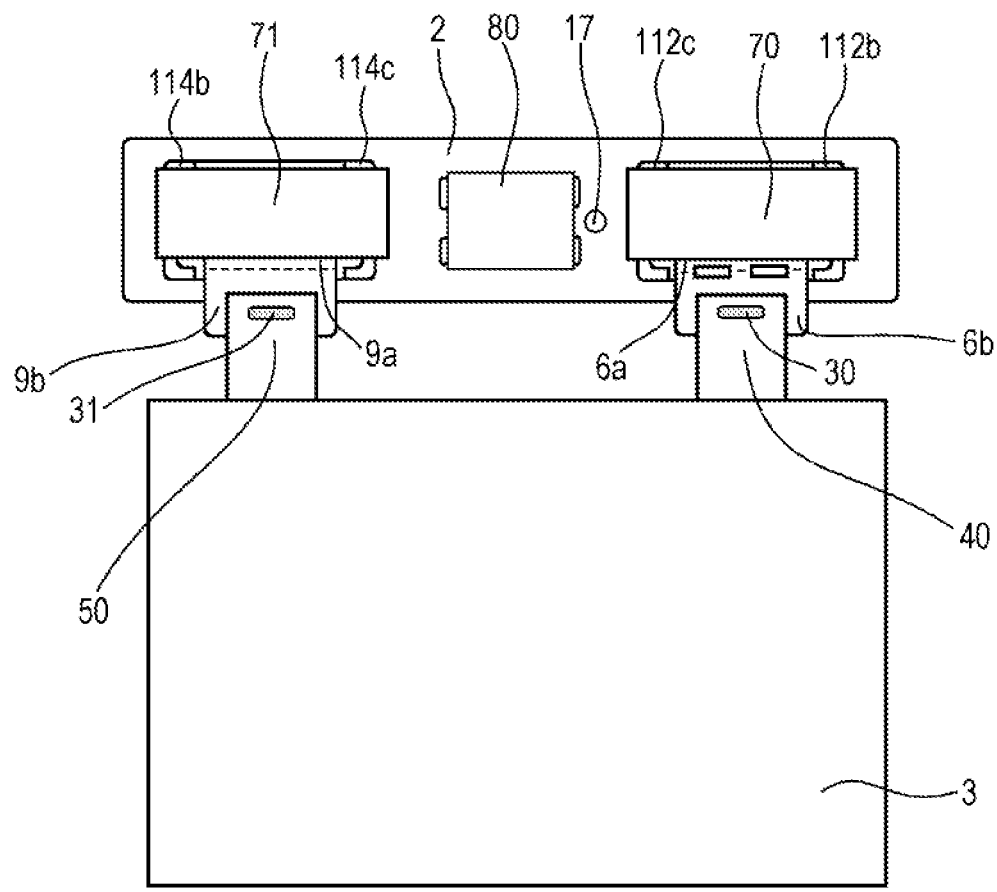
FIG. 13 illustrates the surface of the sealing plate facing the electrode body and the electrode body of the rectangular secondary battery according to the first modification, after a cover has been attached to an inner insulator.

As illustrated in FIG. 13, a cover 70 is disposed so as to face the base portion 6a of the positive-electrode current collector 6. The cover 70 is connected to the inner insulator 112. A cover 71 is disposed so as to face the base portion 9a of the negative-electrode current collector 9. The cover 71 is connected to the inner insulator 114. The positive-electrode current collector 6 and the negative-electrode current collector 9 are folded after being respectively connected to the inner insulator 112 and the inner insulator 114.

Figure 14:
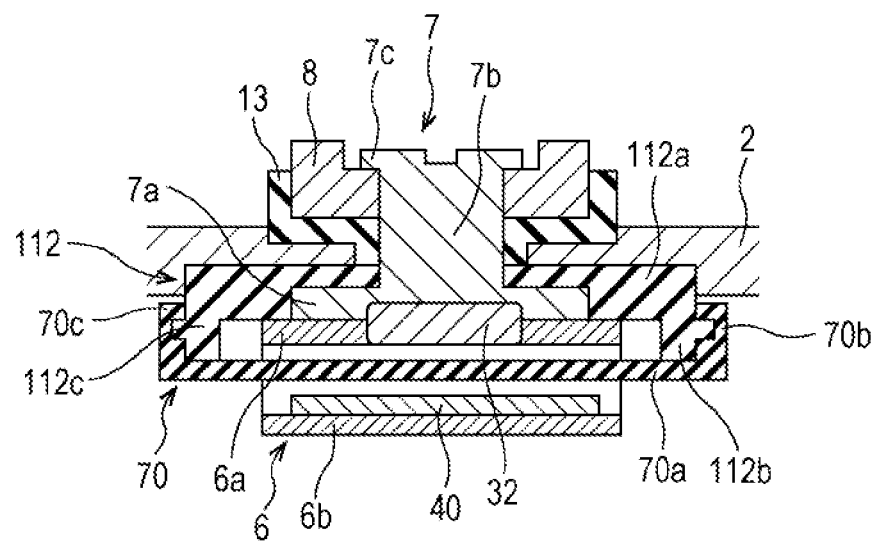
FIG. 14 is a sectional view of a region near a positive electrode terminal of the rectangular secondary battery according to the first modification, taken in the longitudinal direction of the sealing plate.

FIG. 14 is a sectional view of a region near the cover 70 of the rectangular secondary battery according to the first modification, taken in the longitudinal direction of the sealing plate. As illustrated in FIG. 14, the cover 70 includes a cover body 70a; and a first arm 70b and a second arm 70c, which extend toward the sealing plate 2 from end portions of the cover body 70a. The first arm 70b and the second arm 70c are respectively connected to the insulator first side wall 112b and the insulator second side wall 112c of the inner insulator 112. Preferably, the connection method is fitting, and more preferably, snap-fitting. Preferably, the cover 70 and the cover 71 are each made of a resin. Note that the cover 71 may be omitted, and only the cover 70 may be used.

Figure 15:
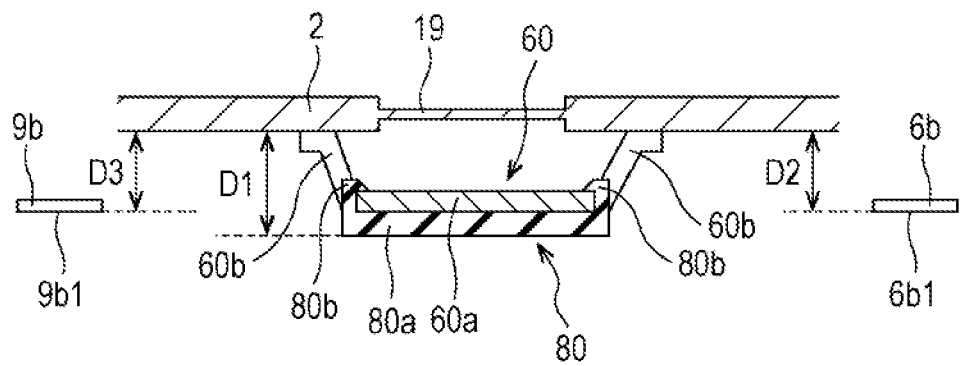
FIG. 15 is a sectional view of a region near a gas discharge valve of the rectangular secondary battery according to the first modification, taken in the longitudinal direction of the sealing plate.

Preferably, as illustrated in FIG. 13, a shielding portion insulator 80, which is made of a resin, is disposed on a surface of the shielding member 60 facing the electrode body 3. Preferably, the shielding portion insulator 80 is attached to the shielding member 60. As illustrated in FIG. 15, the shielding portion insulator 80 includes a body 80a, which faces a surface of the shielding portion 60a of the shielding member 60 facing the electrode body 3, and fixing portions 80b disposed on the body 80a. The fixing portions 80b are engaged with and fixed to the shielding portion 60a. The shielding portion insulator 80 may be connected to the shielding member 60 by adhesion or molding.

As illustrated in FIG. 15, a distance D1 is defined as the distance between the sealing plate 2 and a surface of the shielding portion insulator 80 facing the electrode body 3 in the direction perpendicular to the sealing plate 2. A distance D2 is defined as the distance between the sealing plate 2 and a surface 6b1 of the tab connection portion 6b of the positive-electrode current collector 6 facing the electrode body 3 in the direction perpendicular to the sealing plate 2. A distance D3 is defined as the distance between the sealing plate 2 and a surface 9b1 of the tab connection portion 9b of the negative-electrode current collector 9 facing the electrode body 3 in the direction perpendicular to the sealing plate 2. Preferably, D1 is greater than D2. Preferably, D1 is greater than D3. In this case, it is possible to prevent the electrode body 3 from damaging the joint between the current collector and the tab group, the fuse portion, and the like, even if the electrode body 3 moves toward the sealing plate 2 due to an impact or vibration. Preferably, the cover 70 and the shielding portion insulator 80 are independent components that are not in contact with each other.

In the rectangular secondary battery according to the first modification, the cover 70, which is an insulator, is disposed between the base portion 6a and the tab connection portion 6b of the positive-electrode current collector 6. Thus, it is possible to prevent a conduction path from being formed again due to contact between the base portion 6a of the positive-electrode current collector 6 and the tab connection portion 6b or contact between the base portion 6a and the positive-electrode tab group 40 after the fuse portion 6c of the positive-electrode current collector 6 blows. Moreover, the cover 70 is stably connected to the inner insulator 112, and displacement of the cover 70 due to vibration or an impact can be effectively prevented.

Second Modification

Figure 16:
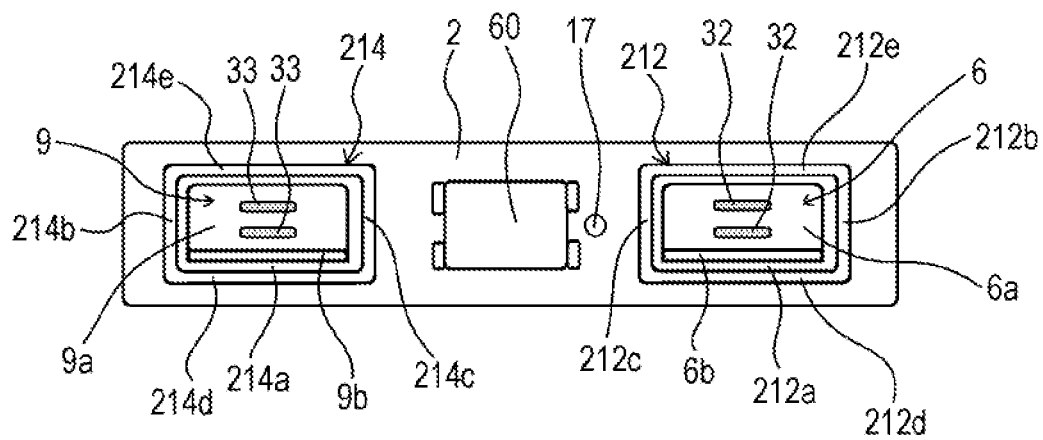
FIG. 16 illustrates a surface, facing the electrode body, of a sealing plate of a rectangular secondary battery according to a second modification after components have been attached.

A rectangular secondary battery according to a second modification differs from the rectangular secondary battery according to the first modification in the shape of the inner insulator. FIG. 16 illustrates a surface of the sealing plate 2, facing the electrode boy, of the rectangular secondary battery according to the second modification after components have been attached. On the surface of the sealing plate 2 facing inside of the battery, the flange portion 7a of the positive electrode terminal 7 and the positive-electrode current collector 6 are disposed via an inner insulator 212. On the surface of the sealing plate 2 facing inside of the battery, the flange portion 10a of the negative electrode terminal 10 and the negative-electrode current collector 9 are disposed via an inner insulator 214.

The inner insulator 212 includes an insulator base portion 212a disposed along the sealing plate 2, an insulator first side wall 212b protruding from the insulator base portion 212a toward the electrode body 3, an insulator second side wall 212c, an insulator third side wall 212d, and an insulator fourth side wall 212e. The inner insulator 214 includes an insulator base portion 214a disposed along the sealing plate 2, an insulator first side wall 214b protruding from the insulator base portion 214a toward the electrode body 3, an insulator second side wall 214c, an insulator third side wall 214d, and an insulator fourth side wall 214e. The positive-electrode current collector 6 and the negative-electrode current collector 9 are folded beforehand and connected to the positive electrode terminal 7 and the negative electrode terminal 10.

Figure 17:
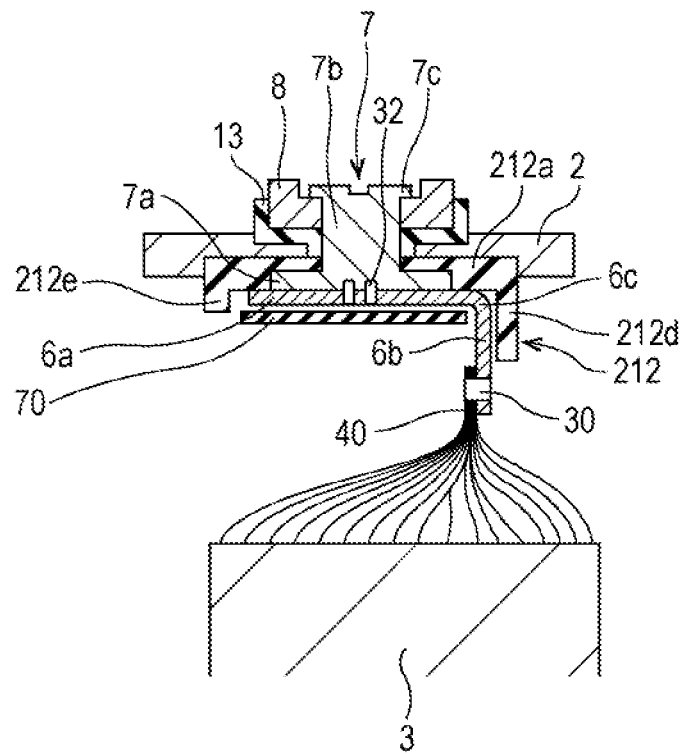
FIG. 17 is a sectional view of a region near a positive electrode terminal of the rectangular secondary battery according to the second modification before a positive-electrode current collector is bent, taken in the transversal direction of the sealing plate.

Subsequently, as illustrated in FIG. 17, the positive-electrode tab group 40 is welded to the tab connection portion 6b of the positive-electrode current collector 6. The negative-electrode tab group 50 is welded to the tab connection portion 9b of the negative-electrode current collector 9. Subsequently, the cover 70 is connected to the inner insulator 212, and the cover 71 is connected to the inner insulator 214. Preferably, the first arm 70b of the cover 70 is welded to the insulator first side wall 212b, and the second arm 70c is welded to the insulator second side wall 212c.

Figure 18:
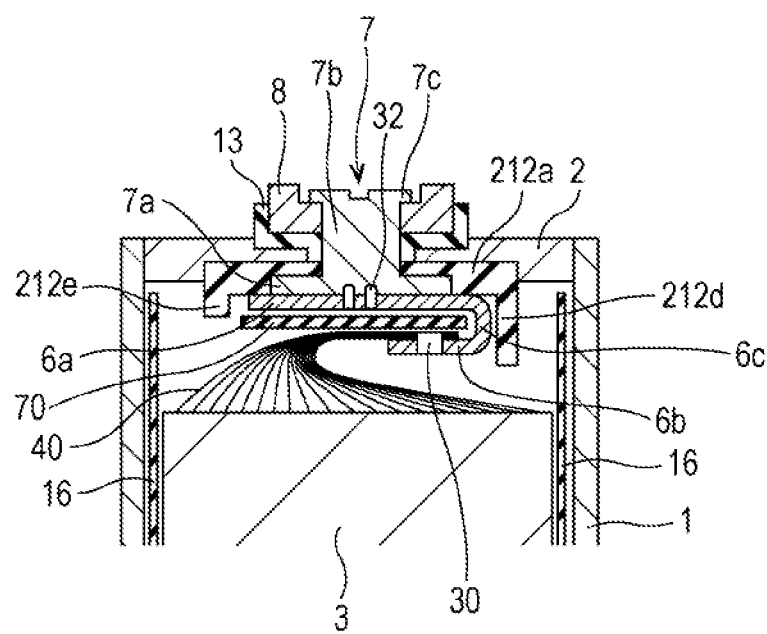
FIG. 18 is a sectional view of a region near the positive electrode terminal of the rectangular secondary battery according to the second modification, after the positive-electrode current collector has been bent, taken in the transversal direction of the sealing plate.

Subsequently, as illustrated in FIG. 18, the positive-electrode current collector 6 is further folded at the boundary between the base portion 6a and the tab connection portion 6b. The fuse portion 6c is disposed at the boundary between the base portion 6a and the tab connection portion 6b. The insulator third side wall 212d of the inner insulator 212 is disposed at a position where the insulator third side wall 212d faces the fuse portion 6c. Preferably, in the direction perpendicular to the sealing plate 2, an end of the insulator third side wall 212d adjacent to the electrode body 3 is located nearer than the fuse portion 6c to the electrode body 3. In this case, it is possible to suppress splashing of molten metal toward the rectangular casing 1 when the fuse portion 6c blows. An insulating sheet 16 may be affixed to the insulator third side wall 212d by adhesion or fusing. Preferably, in the direction perpendicular to the sealing plate 2, an end of the insulating sheet 16 adjacent to the sealing plate 2 is located nearer than an end of the insulator third side wall 212d adjacent to the electrode body 3 to the sealing plate 2.

Short-Circuit Mechanism

Preferably, a rectangular secondary battery includes a short-circuit mechanism that operates when the pressure inside the battery case becomes a predetermined pressure or higher due to overcharging. When the short-circuit mechanism operates, the positive electrode plate and the negative electrode plate are short-circuited at a position outside the electrode body. Thus, it is possible to prevent progress of overcharging. Preferably, a fuse portion is formed in the positive electrode current collector or the like. When the short-circuit mechanism operates, a short-circuit current flows through the rectangular secondary battery, and the fuse portion blows. Thus, it is possible to more reliably prevent progress of overcharging.

Figure 19A:
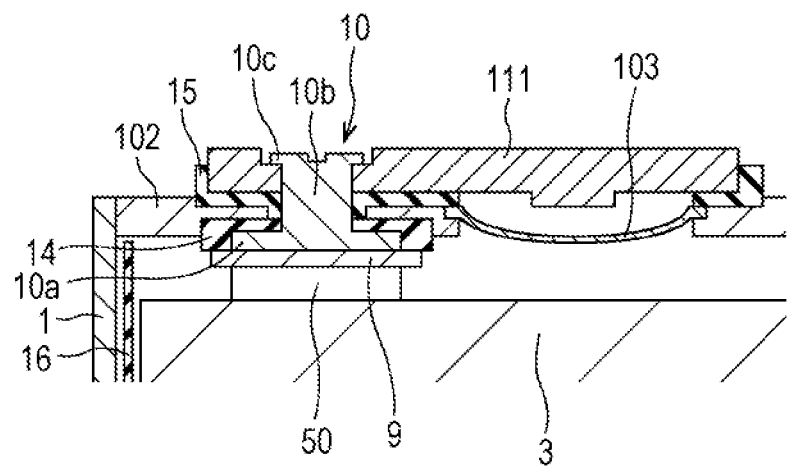
FIG. 19A illustrates the structure of a region near a negative electrode terminal of a rectangular secondary battery including a short-circuit mechanism.
Figure 19B:
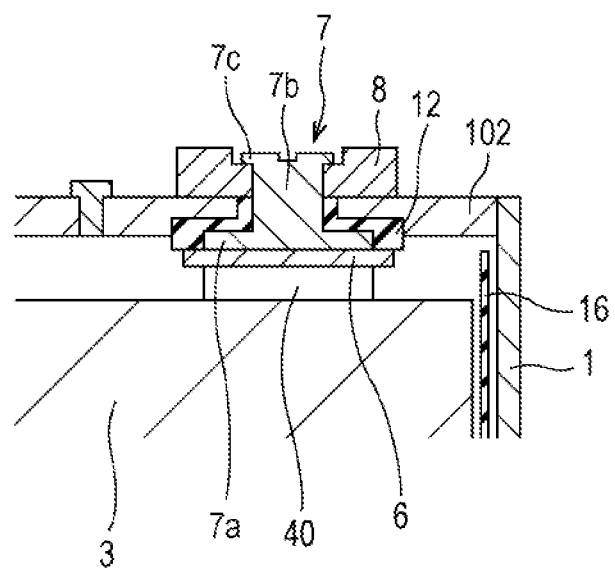
FIG. 19B illustrates the structure of a region near a positive electrode terminal of the rectangular secondary battery including the short-circuit mechanism.

FIG. 19A is a sectional view of a region near the negative electrode terminal 10 of a rectangular secondary battery including a short-circuit mechanism, taken in the longitudinal direction of a sealing plate 102. FIG. 19B is a sectional view of a region near the positive electrode terminal 7 of the rectangular secondary battery including the short-circuit mechanism, taken in the longitudinal direction of the sealing plate 102.

As illustrated in FIG. 19A, the sealing plate 102 has a deformable portion 103. The negative-electrode tab group 50 is connected to the negative electrode current collector 9. The negative electrode current collector 9 is connected to the flange portion 10a of the negative electrode terminal 10. The insertion portion 10b of the negative electrode terminal 10 is inserted into a through-hole in the inner insulator 14, a negative-electrode-terminal attachment hole in the sealing plate 102, a through-hole in the outer insulator 15, and a through-hole in a negative-electrode outer conductor 111. An end portion of the insertion portion 10b is upset on the negative-electrode outer conductor 111. The negative-electrode outer conductor 111 extends to a position where the negative-electrode outer conductor 111 faces the deformable portion 103 of the sealing plate 102. A conductor different from the negative-electrode outer conductor 111 may be electrically connected to the negative electrode terminal 10 and may be disposed at a position where the conductor faces the deformable portion 103.

As illustrated in FIG. 19B, the positive-electrode outer conductor 8 is disposed directly on the sealing plate 102. Accordingly, the positive electrode plate 4 is electrically connected to the sealing plate 102 via the positive-electrode tab group 40, the positive electrode current collector 6, the positive electrode terminal 7, and the positive-electrode outer conductor 8. A conductor may be disposed between the positive-electrode outer conductor 8 and the sealing plate 102. The positive electrode current collector 6 may be directly welded to the sealing plate 102.

When the pressure inside the battery case becomes a predetermined pressure or higher, the deformable portion 103 becomes deformed so as to approach the negative-electrode outer conductor 111, and the deformable portion 103 and the negative-electrode outer conductor 111 are electrically connected to each other. Thus, the positive electrode plate 4 and the negative electrode plate 5 are electrically short-circuited via the sealing plate 102 and the deformable portion 103. Then, a short-circuit current flows through the rectangular secondary battery, and the fuse portion of the positive-electrode current collector 6 blows. Thus, the reliability of the rectangular secondary battery when the rectangular secondary battery is overcharged is improved. The short-circuit mechanism operates at a pressure lower than a pressure at which the gas discharge valve 19 operates.

Others

In the embodiment described above, the electrode body is a stacked type electrode body. The electrode body may be a rolled electrode body in which a strip-shaped positive electrode plate and a strip-shaped negative electrode plate are rolled up with a strip-shaped separator therebetween. The electrode body may include a plurality of rolled electrode bodies.

A part of an inner insulator, made of a resin, may be folded in such a way that a part of the inner insulator is disposed between a base portion and a tab connection portion of the current collector.

While detailed embodiments have been used to illustrate the present invention, to those skilled in the art, however, it will be apparent from the foregoing disclosure that various changes and modifications can be made therein without departing from the spirit and scope of the invention. Furthermore, the foregoing description of the embodiments according to the present invention is provided for illustration only, and is not intended to limit the invention.

What is claimed is:

1. A rectangular secondary battery comprising:
   a rectangular casing that has an opening;
   a sealing plate that seals the opening;
   an electrode body that is disposed in the rectangular casing and that includes a positive electrode plate and a negative electrode plate;
   a tab that is connected to the positive electrode plate or the negative electrode plate;
   a current collector that is connected to the tab;
   a terminal that is electrically connected to the current collector and that extends through the sealing plate; and
   an inner insulator that is disposed between the sealing plate and at least one of the terminal and the current collector,
   wherein a first tab group that is composed of a plurality of the tabs is connected to the electrode body,
   wherein the first tab group is disposed between the sealing plate and the electrode body, wherein the current collector includes a base portion and a tab connection portion that is folded from an end of the base portion, wherein the tab connection portion of the current collector is connected to the first tab group, wherein a fuse portion is formed in the current collector, wherein an insulator is disposed between the base portion and the tab connection portion, and wherein the insulator is connected to the inner insulator.

2. The rectangular secondary battery according to claim 1, wherein the terminal includes a flange portion at a position nearer than the sealing plate to the electrode body, and wherein the base portion of the current collector is connected to a surface of the flange portion facing the electrode body.

3. The rectangular secondary battery according to claim 1, wherein the fuse portion is formed at a boundary between the base portion and the tab connection portion.

4. The rectangular secondary battery according to claim 1, further comprising:

a short-circuit mechanism that operates when a pressure inside a battery case, which is composed of the rectangular casing and the sealing plate, becomes a predetermined pressure or higher, and that short-circuits the positive electrode plate and the negative electrode plate at a position outside of the electrode body.

5. The rectangular secondary battery according to claim 1, wherein the insulator includes a first region extending in a longitudinal direction of the sealing plate, and a second region extending from the first region in a transversal direction of the sealing plate, and wherein at least a part of the second region is disposed between the base portion and the tab connection portion.

6. The rectangular secondary battery according to claim 1, wherein the insulator includes a body and an arm extending from the body toward the sealing plate, and wherein the arm is connected to the inner insulator.

* * * * *